US008849505B2

(12) United States Patent
Menard et al.

(10) Patent No.: US 8,849,505 B2
(45) Date of Patent: Sep. 30, 2014

(54) PROTECTING A VEHICLE FROM ENVIRONMENTAL EVENTS

(75) Inventors: Robert Menard, Palatine, IL (US); Gabriel Castillo, Green Oaks, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 997 days.

(21) Appl. No.: 12/621,506

(22) Filed: Nov. 19, 2009

(65) Prior Publication Data

US 2011/0118897 A1  May 19, 2011

(51) Int. Cl.
*G06F 17/00* (2006.01)
*G06F 19/00* (2011.01)
*G01M 17/00* (2006.01)
*G05D 1/00* (2006.01)
*B60J 7/057* (2006.01)
*E05F 15/20* (2006.01)
*B60W 50/14* (2012.01)

(52) U.S. Cl.
CPC ......... *E05F 15/2007* (2013.01); *E05Y 2800/00* (2013.01); *B60W 50/14* (2013.01); *B60W 2550/14* (2013.01); *B60J 7/0573* (2013.01); *B60W 2550/12* (2013.01)
USPC ............. 701/36; 701/49; 701/29.1; 701/32.4; 340/901; 307/9.1

(58) Field of Classification Search
USPC ............. 701/1, 36, 49, 29.1, 31.4, 32.3, 32.4, 701/400, 408, 415, 468, 532, 537, 538, 701/300; 307/9.1, 10.1; 340/901, 905, 438
See application file for complete search history.

(56) References Cited

U.S. PATENT DOCUMENTS

| | | | | |
|---|---|---|---|---|
| 5,330,385 A * | 7/1994 | Hotta et al. | ..................... | 454/75 |
| 6,243,022 B1 * | 6/2001 | Furukawa | .................. | 340/13.31 |
| 6,819,236 B2 * | 11/2004 | Kawai et al. | ............ | 340/539.24 |
| 7,441,414 B2 * | 10/2008 | Ziehr et al. | ...................... | 62/244 |
| 7,705,721 B1 * | 4/2010 | Chen et al. | ..................... | 340/518 |
| 2001/0020893 A1 * | 9/2001 | Kawai et al. | ............... | 340/425.5 |
| 2002/0109583 A1 * | 8/2002 | Losey | .......................... | 340/5.72 |
| 2005/0128068 A1 * | 6/2005 | Winick et al. | ................. | 340/517 |
| 2006/0006701 A1 * | 1/2006 | Wells | ............................ | 296/223 |
| 2009/0055046 A1 * | 2/2009 | Harumoto et al. | ............. | 701/36 |
| 2010/0023210 A1 * | 1/2010 | Flick | ............................... | 701/36 |
| 2011/0160935 A1 * | 6/2011 | Newman et al. | .................. | 701/2 |

* cited by examiner

*Primary Examiner* — Thomas Tarcza
*Assistant Examiner* — Edward Pipala

(57) ABSTRACT

Methods and systems for locating a vehicle are disclosed, including detecting one or more environmental conditions, the one or more environmental conditions being indicative of an occurrence of an environmental event, determining a probability of the occurrence of the environmental event in response to detecting the one or more environmental conditions, and effecting a preventive action in response to the probability being above a threshold probability, the preventive action being configured to protect the vehicle from the environmental event.

18 Claims, 5 Drawing Sheets

PROTECTING A VEHICLE FROM ENVIRONMENTAL EVENTS

I. BACKGROUND

The invention relates generally to the field of protecting a vehicle by predicting environmental events and taking preventive action.

II. SUMMARY

In one respect, disclosed is a method for protecting a vehicle, the method comprising detecting one or more environmental conditions, the one or more environmental conditions being indicative of an occurrence of an environmental event; determining a probability of the occurrence of the environmental event in response to detecting the one or more environmental conditions; and effecting a preventive action in response to the probability being above a threshold probability, the preventive action being configured to protect the vehicle from the environmental event.

In another respect, disclosed is an apparatus for protecting a vehicle, the apparatus comprising: one or more processors; one or more memory units coupled to the one or more processors; one or more environmental condition detectors coupled to one or more processors; and one or more preventive action modules coupled to one or more processors; the apparatus being configured to: detect one or more environmental conditions using the one or more detectors, the one or more environmental conditions being indicative of an occurrence of an environmental event; determine a probability of the occurrence of the environmental event in response to detecting the one or more environmental conditions; and effect a preventive action to protect the vehicle from the environmental event using the one or more preventive action modules in response to the probability being above a threshold probability.

In yet another respect, disclosed is a computer program product embodied on computer operable media, the computer program product comprising logic instructions effective to: detect one or more environmental conditions, the one or more environmental conditions being indicative of an occurrence of an environmental event; determine a probability of the occurrence of the environmental event in response to detecting the one or more environmental conditions; and effect a preventive action in response to the probability being above a threshold probability, the preventive action being configured to protect the vehicle from the environmental event.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
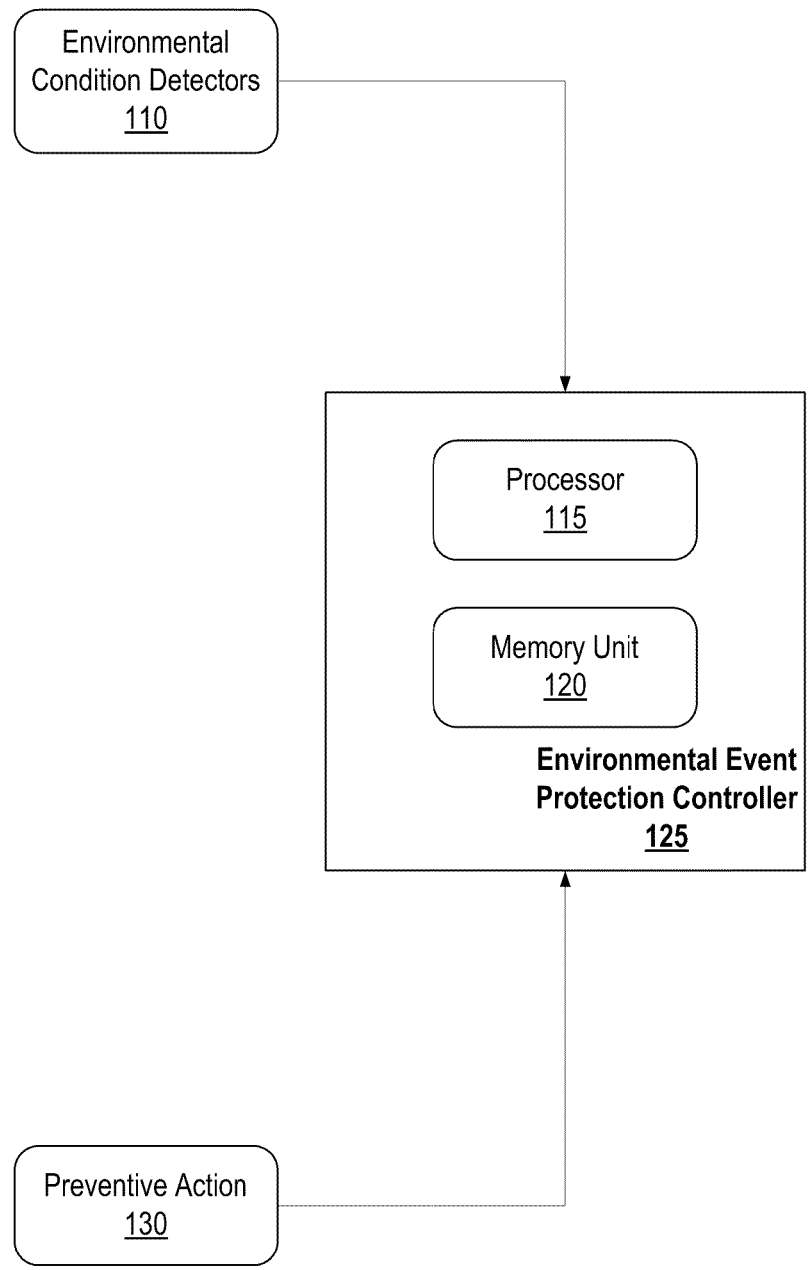
FIG. 1 is a block diagram illustrating a system for protecting a vehicle from environmental events, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, systems and methods are disclosed for protecting a vehicle from certain environmental events, such as rain, hail, snow, high winds, etc. In some embodiments, local environmental conditions may be measured by detectors on the vehicle and relayed to a controller to be used in determining the probability of an environmental event for the purpose of enabling the controller to effect preventive action as necessary. Such environmental conditions may include atmospheric pressure, ambient light levels, temperature, wind, and humidity. In some embodiments, the environmental events (such as rain, hail, snow, high winds, etc.) may also be monitored as environmental conditions and used in determining the probability of the occurrence of the events. For example, if rain is detected, there is a 100% probability that rain will occur.

In some embodiments, external data regarding the probability of an environmental event may also be relayed to a communications device in the vehicle and may also be used in determining the probability of an environmental event in the vicinity of the vehicle. In some embodiments, environmental events may be measured directly to protect the vehicle in the case that preceding environmental conditions do not provide adequate predictive capability to effect preventive action before the onset of an environmental event.

In some embodiments, the controller may perform a check to see if one or more environmental vulnerabilities (such as windows, sunroof, or convertible top being open) exist before processing environmental conditions and external data regarding environmental events.

In some embodiments, the severity of the environmental event may also be determined and considered in determining whether to take preventive action. For example, if an extremely low severity of rain is predicted, no preventive action may be necessary. Alternatively, if an event with extremely high severity is predicted, preventive action may be taken even when the predicted probability is below the probability threshold.

In some embodiments, the time to the occurrence of the environmental event may also be determined and considered in the determination process. For example, preventive action may be taken only if an environmental event is predicted to occur within less than a predetermined time. For example, preventive action may be taken only if rain will be occurring within 15 minutes.

In some embodiments, the vehicle may issue audio and/or visual warnings prior to taking preventive action in order to allow vehicle occupants time to either stop the preventive actions or remove themselves from harm's way as preventive actions are effected.

In some embodiments, preventive actions may include one or more of: closing windows, closing the sunroof, closing the convertible top, and sending a message to the vehicle user (or users, for example, via SMS or phone call) to allow the user to take preventive action, such as manually closing the windows of the vehicle. In some embodiments, the timing and the nature of the messages may vary according to the environmental event being predicted. For example, in the case of hail, a message may be sent providing adequate time and a suggestion that the owner take further protective measures such as putting a cover over the car, driving the car to a geographic area away from the hail storm, or driving the car to a protected parking space such as a garage.

FIG. 1 is a block diagram illustrating a system for protecting a vehicle from environmental events, in accordance with some embodiments.

In some embodiments, environmental event protection controller 125 is configured to receive environmental condition data from environmental condition detectors 110 and to send instructions for preventive actions to preventive action block 130.

In some embodiments, environmental event protection controller 125 comprises processor 115 and memory unit 120, which are directly or indirectly coupled to each other. Processor 115 is configured to perform computations and general control operations and memory unit 120 is configured to store data using non-volatile memory, volatile memory, or both.

In some embodiments, environmental condition detectors 110 are configured to measure data regarding environmental conditions and transmit this data to environmental event protection controller 125.

In some embodiments, environmental condition detectors 110 may be configured to measure environmental events directly to protect the vehicle in the case that preceding environmental conditions do not provide adequate predictive capability to effect preventive action before the onset of an environmental event.

In some embodiments, preventive action block 130 is configured to take preventive action such as closing open windows.

Figure 2:
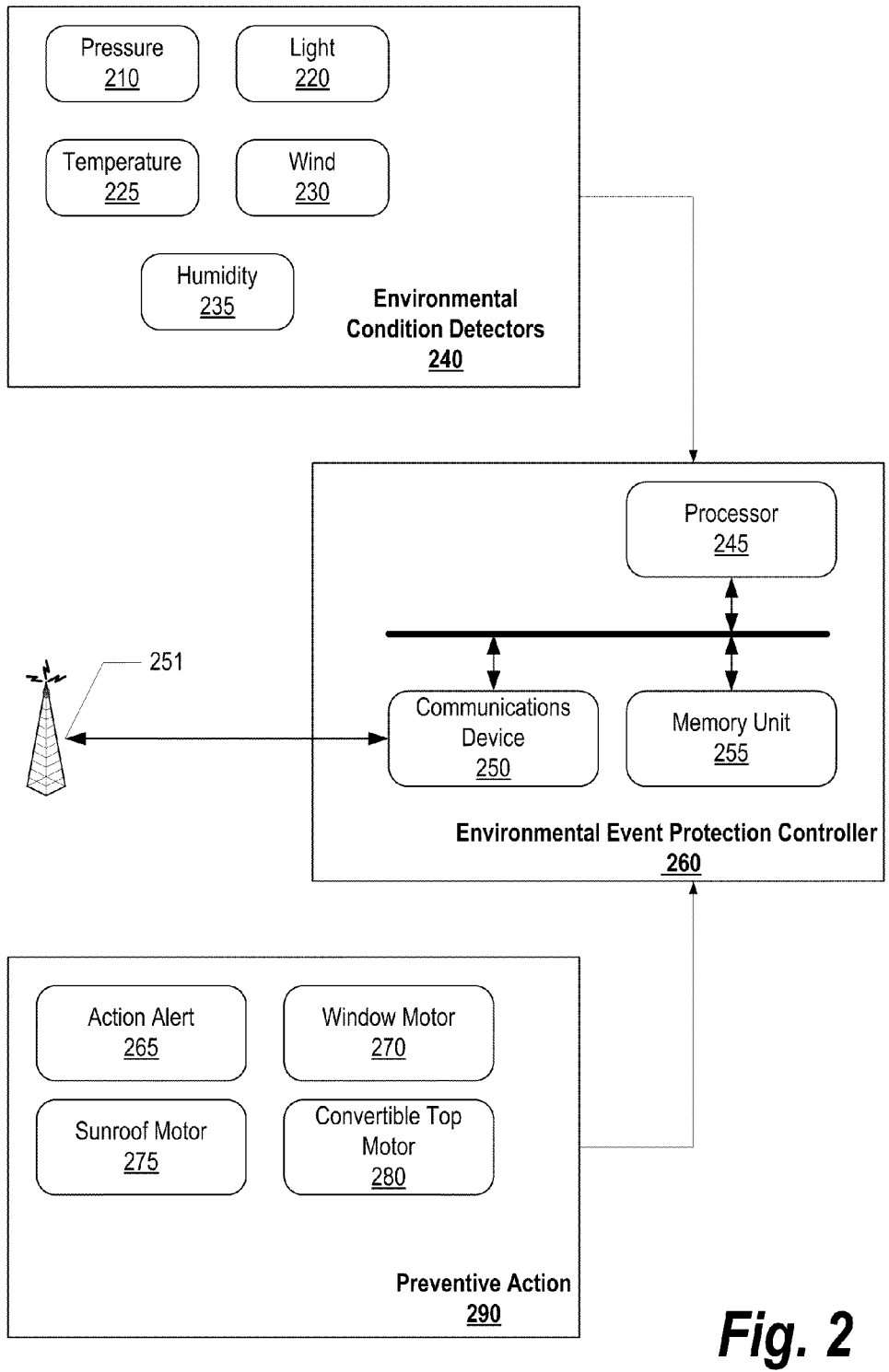
FIG. 2 is a block diagram illustrating a system for detecting environmental conditions, receiving external data, determining the probability of an environmental event and taking preventive action, in accordance with some embodiments.

FIG. 2 is a block diagram illustrating a system for detecting environmental conditions, receiving external data, determining the probability of an environmental event and taking preventive action, in accordance with some embodiments.

In some embodiments, environmental event protection controller 260 is configured to receive environmental condition data from environmental condition detectors 240 and to send instructions for preventive actions to preventive action block 290. In some embodiments, environmental event protection controller 260 is configured to compute the probability of an environmental event from environmental condition data and determine whether preventive actions are necessary.

In some embodiments, environmental event protection controller 260 comprises processor 245, memory unit 255, and communications device 250 which are directly or indirectly coupled to each other. Processor 245 is configured to perform computations and general control operations. Memory unit 255 is configured to store data using non-volatile memory, volatile memory, or both. Communications device 250 is configured to receive external data from external sources such as wireless antenna 251 and to transmit messages to the vehicle's owner such as SMS, phone messages or email.

In some embodiments, environmental condition detectors 240 is configured to measure data regarding environmental conditions and transmit this data to environmental event protection controller 260.

In some embodiments, environmental condition detectors 240 comprises pressure sensor 210, light sensor 220, temperature sensor 225, wind sensor 230, and humidity sensor 235.

In some embodiments, environmental condition detectors 240 may be configured to measure environmental events directly to protect the vehicle in the case that preceding environmental conditions do not provide adequate predictive capability to effect preventive action before the onset of an environmental event.

In some embodiments, preventive action block 290 comprises action alert 265, window motor 270, sunroof motor 275, and convertible top motor 280.

In some embodiments, preventive action block 290 is configured to take preventive action such as closing open windows, closing an open sunroof, closing an open convertible top, and warning users prior to taking such action.

Figure 3:
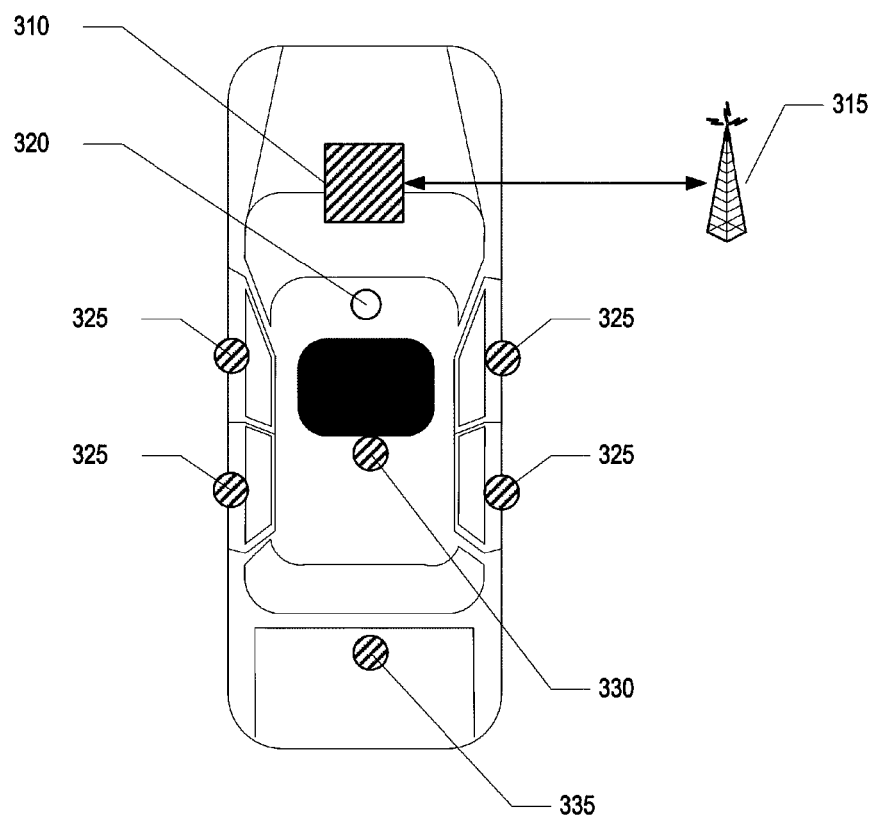
FIG. 3 is a block diagram illustrating a vehicle having one or more detectors to sense environmental conditions, one or more controllers to determine the probability of an environmental event, and one or more motors to effect preventive measures, in accordance with some embodiments.

FIG. 3 is a block diagram illustrating a vehicle having one or more detectors to sense environmental conditions, one or more controllers to determine the probability of an environmental event, and one or more motors to effect preventive measures, in accordance with some embodiments.

In some embodiments, detectors 320 gather data regarding environmental conditions and transmit the data to environmental event protection controller 310. Environmental event protection controller 310 receives external data regarding environmental events from external sources via wireless antenna 315 and determines the probability of an environmental event. If the probability of an environmental event is determined to be above the threshold probability, environmental event protection controller 310 directs one or more of: window motors 325, sunroof motor 330, and convertible top motor 335 to close.

Figure 4:
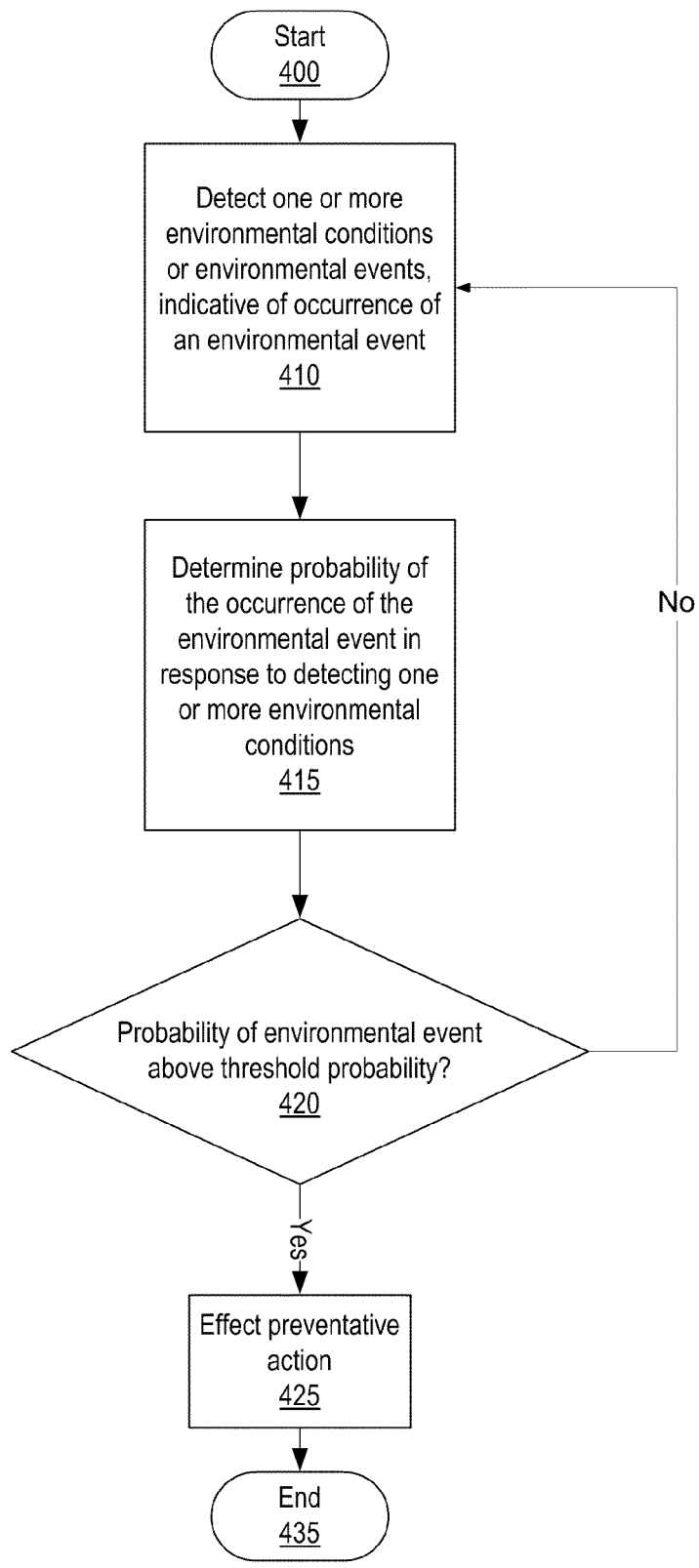
FIG. 4 is a flow diagram illustrating a method for protecting a vehicle from environmental events, in accordance with some embodiments.

FIG. 4 is a flow diagram illustrating a method for protecting a vehicle from environmental events, in accordance with some embodiments.

In some embodiments, the method illustrated in FIG. 4 may be performed by one or more of the devices illustrated in FIG. 1, FIG. 2, and FIG. 3. Processing begins at 400 whereupon, at block 410, one or more environmental conditions, indicative of the occurrence of an environmental event, are detected. At block 415, the probability of an environmental event occurring in the vicinity of the vehicle is determined. At decision 420, a determination is made as to whether the probability of an environmental event is above the threshold probability. If the probability of an environmental event is above the threshold probability, decision 420 branches to the "yes" branch where, at block 425, preventive actions are taken. Processing subsequently ends at 435.

If the probability of an environmental event is below the threshold probability, decision 420 branches to the "no" branch, whereupon processing again continues at block 410.

Figure 5:
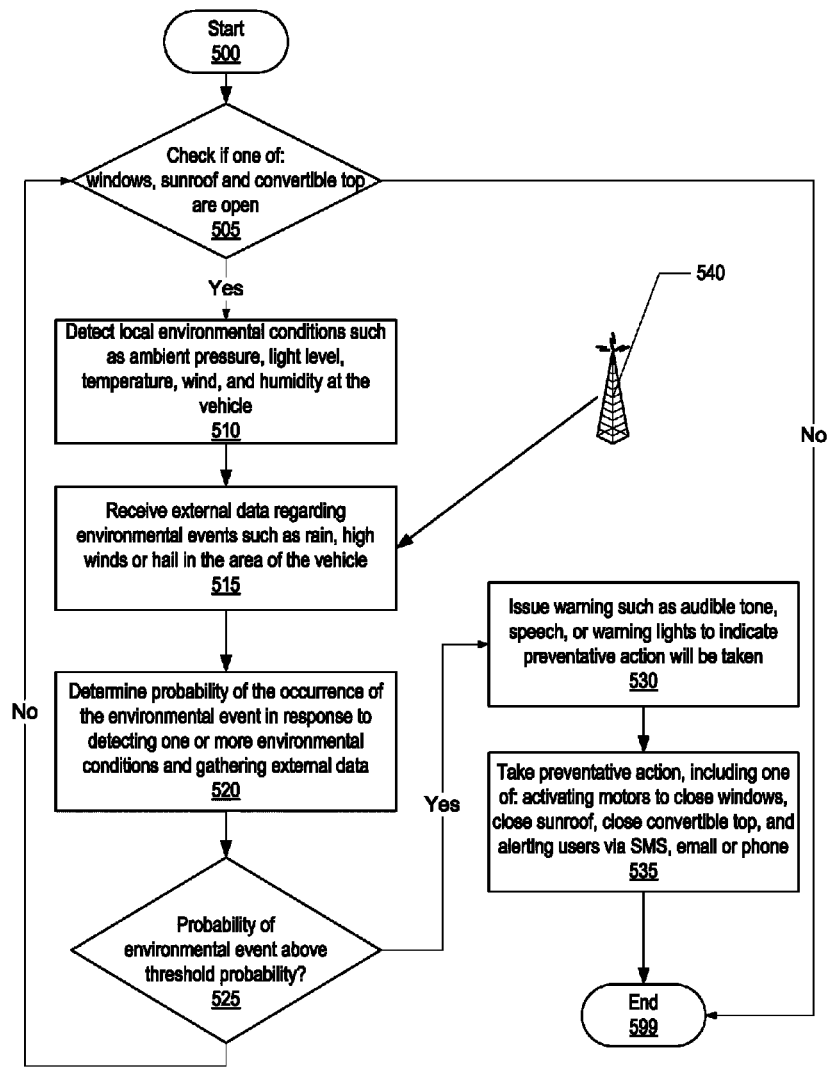
FIG. 5 is a flow diagram illustrating a method for protecting a vehicle from environmental events by determining the probability of an environmental event and taking preventive action, in accordance with some embodiments.

FIG. 5 is a flow diagram illustrating a method for protecting a vehicle from environmental events by determining the probability of an environmental event and taking preventive action, in accordance with some embodiments.

In some embodiments, the method illustrated in FIG. 5 may be performed by one or more of the devices illustrated in FIG. 1, FIG. 2, and FIG. 3. Processing begins at 500 whereupon, at decision 505, a determination is made as to whether one of: windows, sunroof, and convertible top are open. If one of windows, sunroof, and convertible top are closed, decision 505 branches to the "no" branch, whereupon processing ends at 599.

If one of windows, sunroof and convertible top are open, decision 505 branches to the "yes" branch, where at block 510, one or more environmental conditions (e.g. ambient pressure, light level, temperature, wind and humidity), indicative of the occurrence of an environmental event, are detected. At block 515, external data regarding environmental events (e.g. rain, high winds, or hail) in the vicinity of the vehicle are received from external sources such as wireless tower 540. At block 520, the probability of occurrence of an environmental event is determined using local and external data.

At decision 525, a determination is made as to whether the probability of an environmental event is above the threshold probability. If the probability of an environmental event is not above the threshold probability, decision 525 branches to the "no" branch, whereupon processing continues at decision 505.

If the probability of an environmental event is above the threshold probability, decision 525 branches to the "yes" branch, where at block 530, audible and/or visible warnings are issued to indicate that preventive actions will be taken. At block 535, preventive actions are taken including one of: activating motors to close windows, activating motors to close sunroof, activating motors to close convertible top, and alerting users with a message such as SMS, phone call or email. Processing subsequently ends at 599.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for protecting a vehicle, the method comprising:
    detecting one or more environmental conditions, the one or more environmental conditions being indicative of an occurrence of an environmental event and detected by one or more corresponding environmental condition sensors;
    receiving external data wirelessly, the external data being indicative of the occurrence of the environmental event
    determining at an environmental event protection controller, a probability of the occurrence of the environmental event in response to detecting the one or more environmental conditions and the external data; and
    effecting a preventive action in response to the probability being above a threshold probability, the preventive action being performed by the environmental event protection controller and configured to protect the vehicle from the environmental event.

2. The method of claim 1, further comprising:
    wirelessly transmitting an alert message responsive to the step of determining a probability of an environmental event's occurrence.

3. The method of claim 1, further comprising:
    determining the probability and the severity of the environmental event; and
    effecting the preventive action in response to the probability being above the threshold probability and the severity being above the threshold severity.

4. The method of claim 1, further comprising:
    determining a time until the occurrence of the environmental event; and
    effecting the preventive action in response to the time being below a threshold time.

5. The method of claim 1, where the environmental events are at least one of:
    rain, high winds, and hail;
    where the environmental conditions are at least one of:
        atmospheric pressure, ambient light levels, temperature, wind, and humidity;
    where the preventive action is at least one of:
        closing the vehicle's windows, closing the vehicle's convertible top, closing the sunroof, and alerting one or more users.

6. The method of claim 1, further comprising issuing a warning prior to effecting the preventive action.

7. An apparatus for protecting a vehicle, the apparatus comprising:
    one or more processors;
    one or more memory units coupled to the one or more processors;
    one or more environmental condition detectors coupled to one or more processors;

a communications device coupled to a processor, configured to receive external data wirelessly; and one or more preventive action modules coupled to one or more processors;

the apparatus being configured to:
- detect one or more environmental conditions using the one or more detectors, the one or more environmental conditions being indicative of an occurrence of an environmental event;
- determine a probability of the occurrence of the environmental event in response to detecting the one or more environmental conditions and in response to the external data; and
- effect a preventive action to protect the vehicle from the environmental event using the one or more preventive action modules in response to the probability being above a threshold probability.

8. The apparatus of claim 7, where the apparatus is further configured to:
wirelessly transmit an alert message responsive to the step of determining a probability of an environmental event's occurrence.

9. The apparatus of claim 7, where the apparatus is further configured to:
determine the probability and the severity of the environmental event; and
effect the preventive action in response to the probability being above the threshold probability and the severity being above the threshold severity.

10. The apparatus of claim 7, where the apparatus is further configured to:
determine a time until the occurrence of the environmental event; and effect the preventive action in response to the time being below a threshold time.

11. The apparatus of claim 7, where the environmental events are at least one of:
rain, high winds, and hail;
where the environmental conditions are at least one of:
atmospheric pressure, ambient light levels, temperature, wind, and humidity;
where the preventive action is at least one of:
closing the vehicle's windows, closing the vehicle's convertible top, closing the sunroof, and alerting one or more users.

12. The apparatus of claim 7, where the apparatus is further configured to issue a warning prior to effecting the preventive action.

13. A computer program product embodied on a non-transitory computer operable media, the non-transitory computer program product comprising logic instructions effective to:
- detect one or more environmental conditions, the one or more environmental conditions being indicative of an occurrence of an environmental event;
- receive external data wirelessly, the external data being indicative of the occurrence of an environmental event;
- determine a probability of the occurrence of the environmental event in response to detecting the one or more environmental conditions and in response to the external data; and
- effect a preventive action in response to the probability being above a threshold probability, the preventive action being configured to protect the vehicle from the environmental event.

14. The product of claim 13, where the logic instructions are further configured to:
cause the wireless transmission of an alert message responsive to the step of determining a probability of an environmental event's occurrence.

15. The product of claim 13, where the logic instructions are further configured to:
determine the probability and the severity of the environmental event; and
effect the preventive action in response to the probability being above the threshold probability and the severity being above the threshold severity.

16. The product of claim 13, where the logic instructions are further configured to:
determine a time until the occurrence of the environmental event; and
effect the preventive action in response to the time being below a threshold time.

17. The product of claim 13, where the environmental events are at least one of:
rain, high winds, and hail;
where the environmental conditions are at least one of:
atmospheric pressure, ambient light levels, temperature, wind, and humidity;
where the preventive action is at least one of:
closing the vehicle's windows, closing the vehicle's convertible top, closing the sunroof, and alerting one or more users.

18. The product of claim 13, where the logic instructions are further configured to issue a warning prior to effecting the preventive action.

* * * * *